(12) United States Patent
Wang et al.

(10) Patent No.: US 8,918,381 B1
(45) Date of Patent: Dec. 23, 2014

(54) SELECTION CRITERIA DIVERSIFICATION

(71) Applicant: Google Inc., Mountain View, CA (US)

(72) Inventors: Xuerui Wang, Palo Alto, CA (US); Xing Wei, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 13 days.

(21) Appl. No.: 13/671,003

(22) Filed: Nov. 7, 2012

(51) Int. Cl.
*G06F 17/30* (2006.01)

(52) U.S. Cl.
USPC ........... 707/705; 707/706; 707/748; 707/752; 707/754

(58) Field of Classification Search
CPC .................. G06F 17/30646; G06F 17/3071
USPC .................... 707/705, 706, 748, 752, 754
See application file for complete search history.

(56) References Cited

U.S. PATENT DOCUMENTS

| | | | |
|---|---|---|---|
| 6,519,602 B2 | 2/2003 | Sundaresan et al. | |
| 7,054,757 B2 * | 5/2006 | Agrafiotis et al. | 702/19 |
| 7,548,906 B2 * | 6/2009 | Morris et al. | 1/1 |
| 8,452,725 B2 * | 5/2013 | Hatami-Hanza | 707/603 |
| 2007/0299842 A1 * | 12/2007 | Morris et al. | 707/7 |
| 2008/0294609 A1 | 11/2008 | Liu et al. | |
| 2010/0082579 A1 * | 4/2010 | Rajaram | 707/706 |
| 2010/0268712 A1 | 10/2010 | Ngwije | |
| 2012/0016906 A1 | 1/2012 | Tang et al. | |

* cited by examiner

*Primary Examiner* — Baoquoc N To
(74) *Attorney, Agent, or Firm* — Fish & Richardson P.C.

(57) ABSTRACT

Methods, systems, and apparatus for diversifying selection criteria. An example method includes accessing a first set of selection criteria for a content item; selecting, based on the first set of selection criteria, a second set of selection criteria, the second set of selection criteria being a proper subset of the first set of selection criteria, the selection of each of the criteria in the second set comprising: determining a collective performance measure based on criteria that have been selected from the first set of selection criteria for inclusion in the second set of selection criteria, determining, for each criterion that has not been selected from the first set, a performance contribution to the collective performance measure, and selecting from the first set a selection criterion with the highest performance contribution relative to the performance contributions of other selection criteria that have not been selected for inclusion in the second set.

25 Claims, 5 Drawing Sheets

SELECTION CRITERIA DIVERSIFICATION

BACKGROUND

This specification relates to processing selection criteria for selecting content items.

The Internet enables access to a wide variety of content, e.g., video and/or audio files, web pages for particular subjects, news articles, etc. Such access to content has also lead to the providing of additional content items with the content. For example, online advertising involves the providing of advertising content items with resources served over the Internet.

Providers of additional content, such as providers of advertisements, specify selection criteria such as keywords, web sites, geographical locations, etc., that is used to select the content items for impressing in relevant resources, such as web pages that are viewed by users having a potential interest in the products and services offered by an advertiser.

Automatic generation of criteria can be used to generate selection criteria for content item providers. Examples of such automatic generation techniques include automatic keyword generation, automatic generation of demographic features, query expansion, and the like.

SUMMARY

In general, one innovative aspect of the subject matter described in this specification can be embodied in methods that include the actions of accessing a first set of selection criteria for a content item; selecting, based on the first set of selection criteria, a second set of selection criteria, the second set of selection criteria being a proper subset of the first set of selection criteria, the selection of each of the criteria in the second set comprising: determining a collective performance measure based on criteria that have been selected from the first set of selection criteria for inclusion in the second set of selection criteria, determining, for each criterion that has not been selected from the first set, a performance contribution to the collective performance measure, and selecting from the first set a selection criterion with the highest performance contribution relative to the performance contributions of other selection criteria that have not been selected for inclusion in the second set. Other embodiments of this aspect include corresponding systems, apparatus, and computer programs, configured to perform the actions of the methods, encoded on computer storage devices.

Another innovative aspect of the subject matter described in this specification can be embodied in methods that include the actions of determining a plurality of disjoint sets of mapped criteria, each disjoint set of mapped criteria describing: one or more criteria mapped to a representative criterion, and a ranking of the one or more criterion and the representative criterion based on a respective performance metric for each criterion, wherein the representative criterion is ranked highest relative to the one or more criterion in the disjoint set; receiving a request for a content item, the request subject to a set of selection criteria, each of the selection criterion being expandable into one or more expansion criteria; selecting, based the selection criteria, one or more disjoint sets of the mapped criteria, each of the selected disjoint sets being a set to which at least one of the selection criteria belongs; and for each selection criterion in the set of selection criteria, selecting at least one criterion from the disjoint set of mapped criteria to which the selection criterion belongs according to the ranking of the one or more criterion and the representative criterion in the disjoint set of mapped criteria. Other embodiments of this aspect include corresponding systems, apparatus, and computer programs, configured to perform the actions of the methods, encoded on computer storage devices.

Another innovative aspect of the subject matter described in this specification can be embodied in methods that include the actions of for each of a set of expansion records, each expansion record specifying an expansion of a criterion to one or more expansion criteria: generating, by a data processing apparatus, an expansion pair for each expansion criterion of the one or more expansion criterion, each expansion pair being a criterion pair of the criterion and the expansion criterion; for each expansion pair: selecting one of the criterion as a representative criterion for the pair, and the other criterion as the represented criterion, the selection being based on a performance metric of each criterion of expansion pair, determining, by the data processing apparatus, whether the represented criterion is mapped to mapped criterion in the mapping table, in response to determining that the represented criterion is not mapped to mapped criterion in the mapping table, mapping, by the data processing apparatus, the represented criterion to the representative criterion, and in response to determining that the represented criterion is mapped to mapped criterion in the mapping table and that the represented criterion is not mapped to the representative criterion, iteratively generating and processing one or more additional expansion pairs until a new mapping of a represented criterion to a representative criterion for an additional expansion pair is mapped or until the represented criterion of an additional expansion pair is mapped to the representative criterion of the additional expansion pair. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Selecting an expansion criterion with the highest performance contribution relative to the performance contributions of other expansion criteria increases both the diversity of the selected set of expansion criteria and the overall performance of the selected set. Such selection can approach incremental benefit yields that are comparable to human-tuned criteria, while not requiring human intervention. This reduces overall selection criteria management costs. In implementations in which a canonicalized mapping is used, reversion of criteria expansion occurring at serving generates canonical maps to a representative criterion. Only one representative criterion is present in each set. In this way, with a repository size similar to one for human tuned criteria, a system can achieve similar performance and coverage as with significantly more automatically expanded criteria.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Advertisers often use certain criteria such as keywords, web sites, geographical locations, etc., to show their ads in relevant web pages to users. However, managing these criteria is very time consuming. Furthermore, when advertisers use such criteria, the performance of these criteria is largely unknown and advertisers often tune their criteria by trial and error. To address this, automatic generation techniques for criteria have been used to generate criteria of advertisers. The benefits of automatically generated criteria, however, come at a nontrivial increase in serving cost: an order of magnitude more automatic generated criteria are needed to have superior performance than much fewer manually selected criteria due to the lack human supervision. Furthermore, many of these automatic criteria provide overlapping coverage, thus providing little incremental value.

The subject matter of this application diversifies the selection of generated criteria so that each criterion that is selected results in a larger marginal performance increase than for other generated criteria that can be selected. In particular, for a set of selection criteria, the system selects a set of generated criteria. For each selection, the system determines a collective performance measure based on the criteria that have already been selected. The system then determines, for each criterion that has not been selected, a performance contribution to the collective performance measure. Based on these values, the system selects another generated criterion with the highest performance contribution relative to the performance contributions of other generated criteria that have not been selected for inclusion in the set of criteria.

Example Operating Environment

Figure 1:
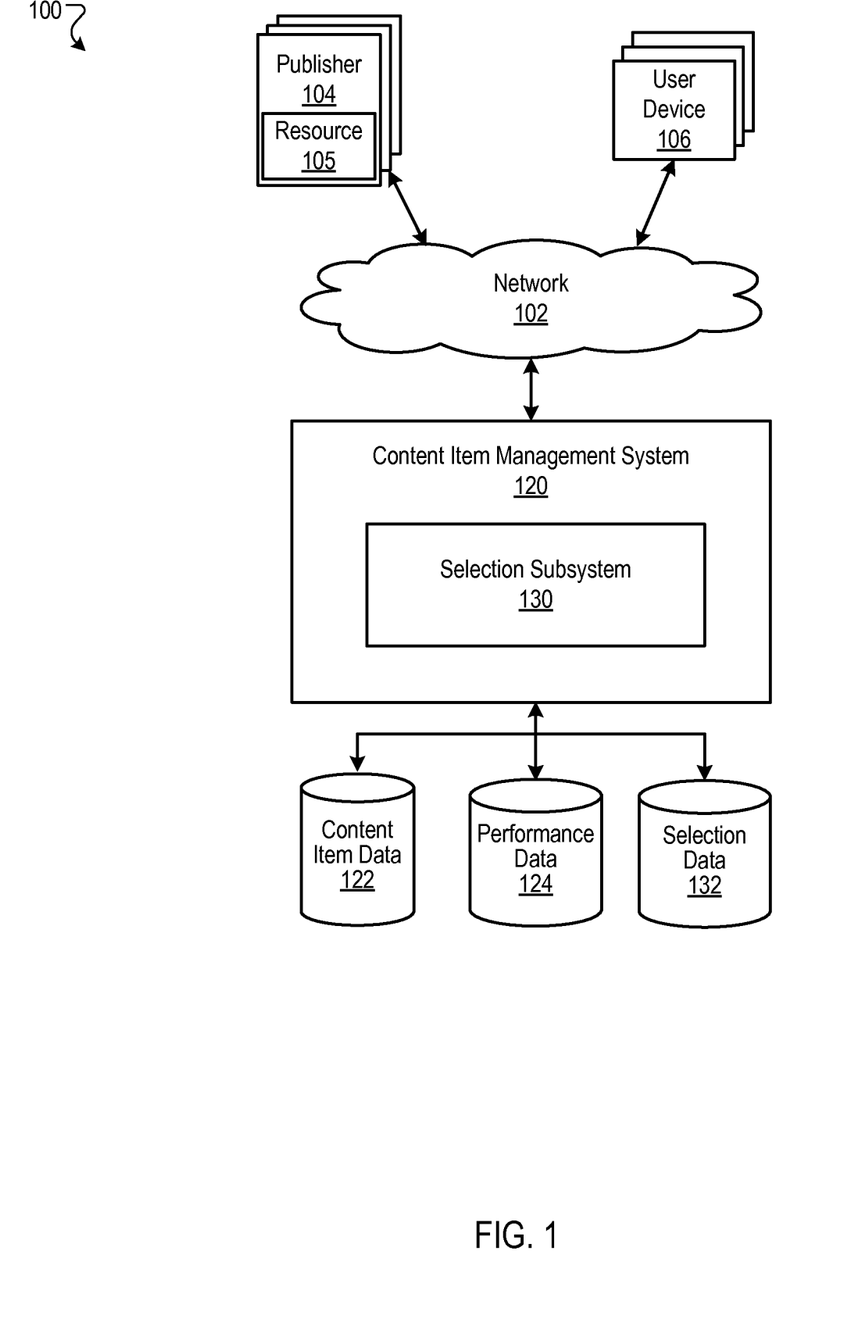
FIG. 1 is an example environment in which a system diversifies selection criteria.

FIG. 1 is an example environment 100 in which a system diversifies selection criteria. A computer network 102, such as a local area network (LAN), wide area network (WAN), the Internet, or a combination thereof, connects publisher web sites 104, user devices 106, and a content item management system 120. The online environment 100 may include many thousands of publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

The content item management system 120 facilitates the provisioning of content items that are shown with the resources 105. One example content item management system is an advertisement management system that allows advertisers to define selection rules that take into account attributes of the particular user to provide selected advertisements for the users. Example selection rules include keyword selection, in which advertiser provide bids for keywords that are present in either search queries (for search result pages) or webpage content (for web pages of particular subject matter). Other selection criteria can also be used.

Advertisements that are associated with keywords having bids that result in an advertisement slot being awarded in response to an auction are selected for displaying in the advertisement slots. When a user of a user device 106 selects an advertisement, the user device 106 generates a request for a landing page of the advertisement, which is typically a webpage of the advertiser. For example, the publishers 104 may include advertisers, each having hosting respective web pages, some of which are landing pages for the advertisements of the advertisers. A resource 105 from a publisher 104 includes instructions that cause the user device to request advertisements from the advertisement management system 120. The request includes a publisher identifier and, optionally, keyword identifiers related to the content of the resource 105. The content item management system 120, in turn, provides selected advertisements to the particular user device.

The content item management system 120 includes a data storage system that stores content item data 122 and performance data 124. The content item data 122 stores content items, selection information, and other information for content item sponsors. For example, in the case of an advertising system, the content item data 122 can be campaign data storing advertisements, selection criteria information such as keywords, demographics, etc., and budgeting information for advertisers. The performance data 124 stores data indicating the performance of the content items that are served. Such performance data can include, for example, click through rates for content items, the number of impressions for content items, the selection criteria for each request for a content item and the corresponding automatically generated criteria, etc. Other performance data can also be stored.

In the case of advertisements, the content item data 122 and the performance data 124 are used as input parameters to an advertisement auction. In particular, the content item management system 120, in response to each request for advertisements, conducts an auction to select advertisements that are provided in response to the request. The auction receives as input, for each advertisement, a bid for the advertisement (such as a cost per click or cost per impression), selection information, and quality data. The selection information may, for example, include keywords, demographic data, and other selection information. The quality information may include quality metric values for a landing page associated with the advertisement. These data are used to generate an auction score for each advertisement, and the advertisements with the highest auction scores are selected to respond to the advertisement request.

A selection subsystem 130 is used to process content item requests and, in some implementations, provide generated criteria based on selection criteria specified for a request.

In some implementations, the selection subsystem 130 receives (or generates) generated criteria from selection criteria specified for a request. The generated criteria that are received or generated are, in some implementations, expansions of the selection criteria, or a predefined set of criteria. For example, for keyword selection criteria, the selection subsystem 130 may receive the generated criteria in the form of keywords from a system that is external to it, or may use a variety of appropriate methods to generate the generated criteria. Such methods include word synonyms, spelling corrections, canonicalization, stopping and stemming different morphological forms, removing stop words, and pseudo (blind) relevance feedback. Other expansion techniques can also be used. In some implementations, the expansion of each criterion of a request are stored in a selection data store 132 for further use, as will be described in more detail below.

Once the generated criteria are determined, the selection subsystem 130 selects from the expanded criteria a set of selection criteria. The cardinality of the set may be based on a serving constraint. The constraint may be fixed, or may vary on a per-request basis. In either case, the generated criteria that are selected are selected, in some implementations, in a manner that evaluates the incremental performance gain for each selection, and chooses the selection that yields the highest performance gain.

For example, assume that keyword selection criteria are used. Keyword A1 can be expanded to keyword A2 in serving. A1 covers 20% of all queries and A2 covers 19% of all queries, but A1 and A2 have 18% of overlapping in coverage. In other words, A2 only provides 1% additional coverage to A1. Similarly, assume B1 can expand to B2, and B1 has 17% coverage and B2 has 16% coverage and also has a 15% overlap with B1. Also assume C1 can expand to C2, and that C1 has 16% coverage and C2 has 15% coverage, and has a 14% overlap with C1. Finally, assume there is no overlapping coverage between any two keywords other than the ones specified above. For an advertisement that can only have three selection criteria, a criteria generation system ranks A1, A2, B1, B2, C1, C2 in decreasing order of coverage. However, taking the highest performing keywords yields a sub-optimal solution: A1, A2 and B1 provides 20%+1%+18%=39% coverage. By determining the incremental gain of each selection, however, the system increases overall performance. For example, for the keywords and coverage metrics described above, the selection subsystem would select A1, B1 and C1 instead of A1, A2 and B2. This results in a total coverage equal to 20%+18%+16%=54%.

Generated Criteria Selection

Figure 2A:
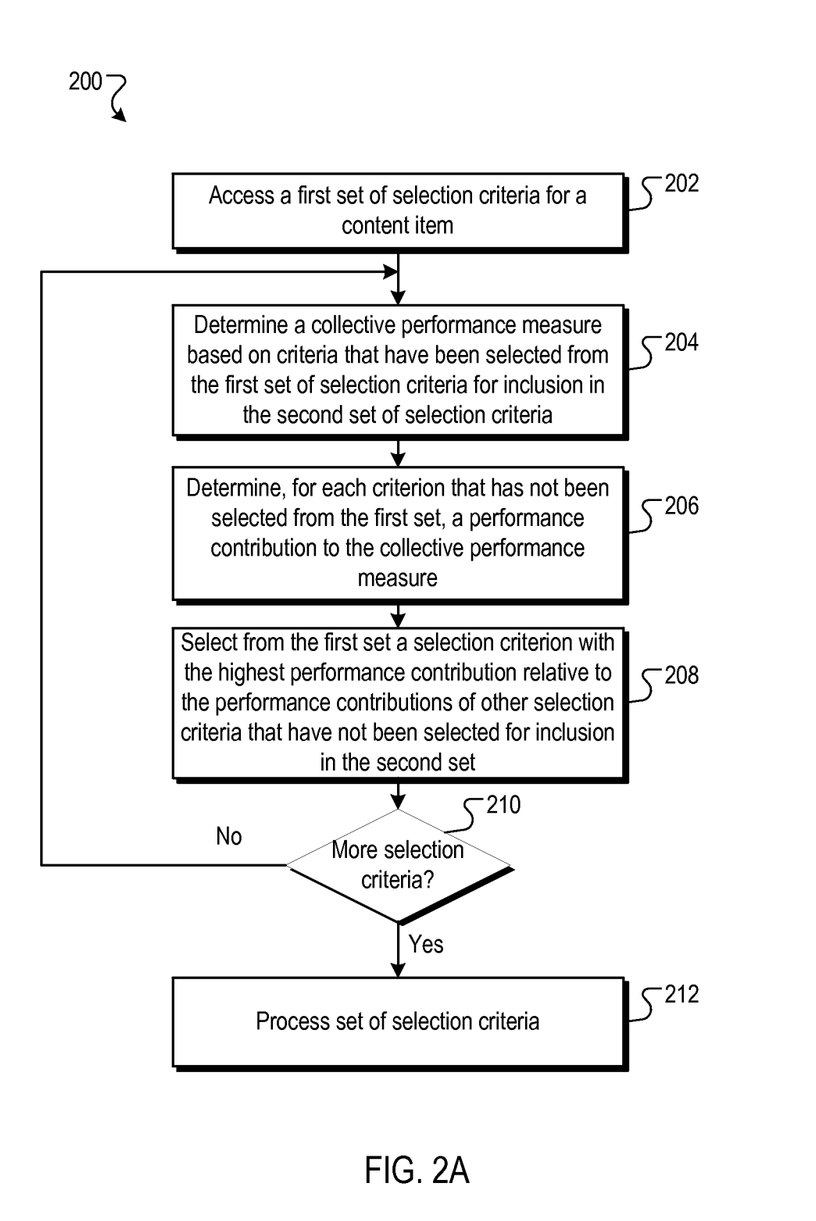
FIG. 2A is a flow diagram of an example process for selecting a diversified set of selection criteria.
Figure 2B:
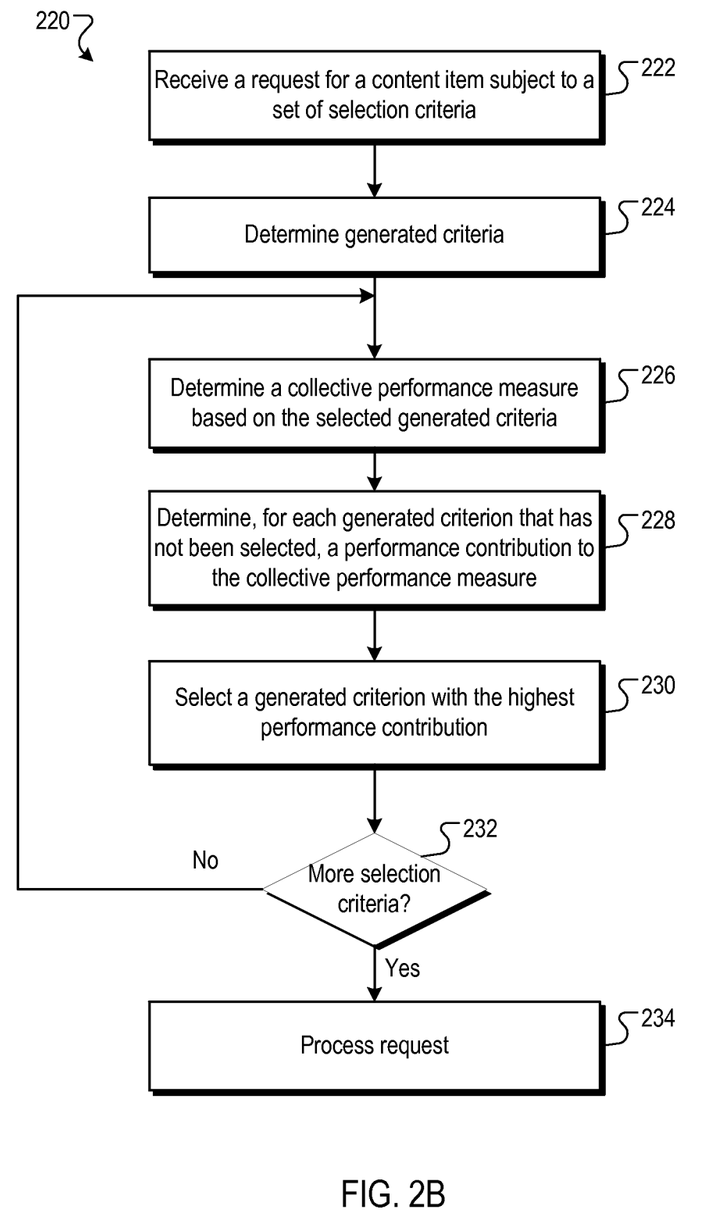
FIG. 2B is a flow diagram of an example process for selecting a diversified set of selection criteria for a content item request.

In general, given a set of selection criteria, a proper subset of the selection criteria are selected in a manner that results in each inclusion of a criterion into the proper subset yielding a highest respective marginal performance gain for the proper subset. FIGS. 2A and 2B show two example processes. In particular, FIG. 2A is a flow diagram of an example process 200 for selecting a diversified set of selection criteria. The process 200, and all other processes described in this document, can be implemented in a data processing apparatus used to realize the selection subsystem 130.

The process 200 accesses a first set of selection criteria for a content item (202). For example, the process 200 may access a set of keywords for an advertising group of an advertising campaign. The keywords may be manually selected, automatically selected, or a combination of manually and automatically selected keywords.

The process 200, by steps 204-208 selects, based on the first set of selection criteria, a second set of selection criteria. The second set of selection criteria is a proper subset of the first set of selection criteria. In particular, the process 200 determines a collective performance measure based on criteria that have been selected from the first set of selection criteria for inclusion in the second set of selection criteria (204). For example, the process 200 may select a first keyword from the first set of keywords with a highest performance metric for the first keyword to include in the second set.

The process 200 determines, for each criterion that has not been selected from the first set, a performance contribution to the collective performance measure (206). For example, the process 200 may determine for each of the first keywords that have not yet been selected the resulting performance of the second set when the keyword is included in the second set. The determination takes into account, for example, overlapping coverage between the second set and each first keyword that has not yet been selected.

The process 200 then selects from the first set the selection criterion with the highest performance contribution relative to the performance contributions of other selection criteria that have not been selected for inclusion in the second set. The selected keyword is thus the keyword that, when added to the second set, yields the largest gain in performance for the second set relative to the other keywords that are not yet selected for inclusion in the set.

The process 200 determines if more selection criteria can be selected (210). If so, the process 200 returns to stage 204, otherwise, the process 200 processes the second set of selection criteria.

The process 200 can be applied in a variety of appropriate operations that require selection criterion processing. One such operation is processing request for content items to be served to user devices. FIG. 2B is a flow diagram of an example process 220 selecting a diversified set of selection criteria for a content item. The process 220 receives a request for a content item subject to a set of selection criteria (222). Each of the selection criteria may be into one or more generated criteria. For example, as described above, keywords A1, B1 and C1 may be specified for the request.

The process 220 determines generated criteria (224). For example, for the keywords A1, B1 and C1, the generated keywords A2, B2 and C2 may be determined.

Based on these generated criteria, the process 220 selects a set of generated criteria by first determining a collective performance measure based on the selected generated criteria (226). For example, the process 220 may select a first keyword from A1, A2, B1, B2, C1 and C2 with the highest coverage, which is A1. The performance measure is 20% coverage.

The process 220 determines, for each generated criterion that has not been selected, a performance contribution to the collective performance measure (228). For example, for the keyword A2, the performance contribution is 1% (20%−19%); for B1, B2, C1 and C2, the performance contributions are 18%, 17%, 16% and 15% coverage, respectively.

The process 220 selects a generated criterion with the highest performance contribution (230). The performance contribution is measured relative to the performance contributions of other generated criteria that have not been selected for inclusion in the set of generated criteria. In this example, B1 has the highest performance contribution (18%), and thus it is selected.

The process 220 determines if more selection criteria can be selected (232). If so, the process returns to stage 226, otherwise, the process 220 processes the request using the selected criteria (234). In this example, the process 220 would perform one more iteration. The performance contributions for A1, B2, C1, and C2 would be, respectively, 1%, 1%, 16% and 15%. Thus, C2 would be selected on the second iteration, and then the process 220 would be process the request using A1, B1 and C1.

Disjoint Generated Criteria Sets

In the example of FIG. 2B, the process 220 evaluated the performance contributions by comparisons of generated criteria performance measures. In some implementations, the process of FIG. 2B can be based on disjoint sets of mapping criteria, and the selections for a particular selection criterion of the request are limited to the disjoint set to which the selection criterion belongs.

Figure 3:
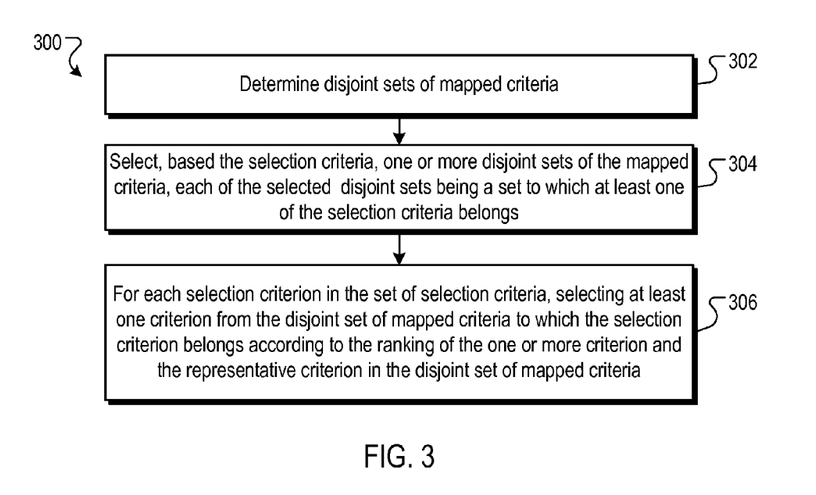
FIG. 3 is a flow diagram of an example process for selecting a diversified set of selection criteria using disjoint mappings.

One example of using disjoint sets is shown in FIG. 3, which is a flow diagram of an example process 300 for selecting a diversified set of selection criteria using disjoint mappings.

The process 300 determines disjoint sets of mapped criteria (302). Each disjoint set of mapped criteria describes one or more criteria mapped to a representative criterion, and a ranking of the one or more criterion and the representative criterion based on a respective performance metric for each criterion. The representative criterion is ranked highest relative to the one or more criterion in the disjoint set. For example, assume a disjoint set includes the following keywords with the following coverage performance measures: A1, 10%; A2, 30%; and A3, 19%. A2 would thus be the representative criterion, and A1 and A3 would be mapped to A2.

The process 300 selects, based the selection criteria, one or more disjoint sets of the mapped criteria, each of the selected disjoint sets being a set to which at least one of the selection criteria belongs. For example, if one of the selection criteria of the request is A3, then the disjoint set of {A1, A2, A3} would be selected.

For each selection criterion in the set of selection criteria, the process 300 selects at least one criterion from the disjoint set of mapped criteria to which the selection criterion belongs according to the ranking of the one or more criterion and the representative criterion in the disjoint set of mapped criteria (306). For example, for the disjoint set of {A1, A2, A3}, the process would select A2 first. If another criterion can be selected from the set, then the process 300 would select A3 next.

In some implementations, the ranking within the disjoint set is based on incremental performance improvement relative to the representative criterion. This may result in different rankings based on performance metrics. For example, for the disjoint set of {A1, A2, A3}, the coverage measures are 10%, 30% and 19%. However, assume that A3 overlaps with A2 such that A3 provide only 3% additional coverage, and A1 overlaps with A2 such that A1 provides 5% additional coverage. In this situation, the ranking would be A2, A1 and then A1, and is based on the cumulative coverage.

In some implementations, the cumulative coverage is determined for each ranked position relative to the criteria that precede the position in the ranking. For example, if a set of four criteria A1-A4 are to be ranked, the first in the ranking is the criterion with the highest metric, e.g., A2. The next in the ranking is the criterion that provides the largest incremental performance increase to A2, e.g., A4. The third in the ranking is the criterion that provides the largest incremental performance increase to the set of {A2, A4}, and so on.

In some situations, the cardinality of the selection criteria for a request may be less than the cardinality of the available disjoint sets from which to choose generated criteria. In such situations, the disjoint sets that are selected are based on a matching of the selection criteria to the disjoint sets, and a ranking of performance of the disjoint sets. The disjoint sets may be ranked, for example, on scores for each set that are the performance of representative criterion for the set, or, alternatively, based on the performance scores of all criteria that belong to the set. In such situations, one disjoint set is selected for each available selection criterion for the request, and the representative criterion for the set is selected for that selection criterion.

Creating Generated Criteria Sets

As described above, expansion techniques are one appropriate way the criteria can be automatically generated. In one implementation, the selection subsystem 130 reverts the expansions generated at serving time and uses one representative criterion for every set of criteria that are expandable to each other. The system then generates a representative criterion for every set of expanded criteria stored in expansion logs. This increases the diversity of selection criteria by reverting the criteria expansion occurring in serving so that a repository need have one representative criterion for each set of criteria that can be expanded to each other.

Expansion reversion, however, is a non-trivial task. In particular, expansions are dynamic and produced by many different techniques. Furthermore, expansion are often one to many (1:n) or many to one (n:1). Finally, expansions are often chained (A is expandable to B which is expandable to C, but A is not directly expandable to C). The chain length varies depending on many intrinsic attributes of selection criteria.

Thus, reverting all the expansions exactly is computationally complex due to the dynamic nature and complexity of expansion. The selection subsystem 130 overcomes this technical problem by taking the observed expansions from expansion logs and generation approximate reversals of the expansions by simplifying the expandable relationships. The expansion reversion represents all criteria among disjoint sets and canonicalizes all criteria in a set to its representative criterion, e.g., the criterion with best performance or coverage. In some implementations, when ranking representative criteria, the total performance score of all criteria in a set is used as the representative criterion's ranking score.

In some implementations, expansion reversion is modeled on the following expansion assumptions:

1) If criterion A is expanded from criterion B, criterion B can expand to criterion A, i.e.:

B→A: A→B

2) If criterion A and criterion B are expanded from criterion C, criterion A and criterion B are considered to be able to expand to each other, i.e.:

C→A & C→B: A↔B

3) If both of criterion A and criterion B expand to criterion C, we regard criterion A and criterion B can expand to each other, i.e.:

A→C & B→C: A↔B

4) If criterion A expands to criterion B, and criterion B expands to criterion C, and so on, we regard criteria A, B, C, etc., are expandable to each other, i.e.:

A→B & B→C & . . . : A↔B, A↔C, B↔C . . . .

Figure 4:
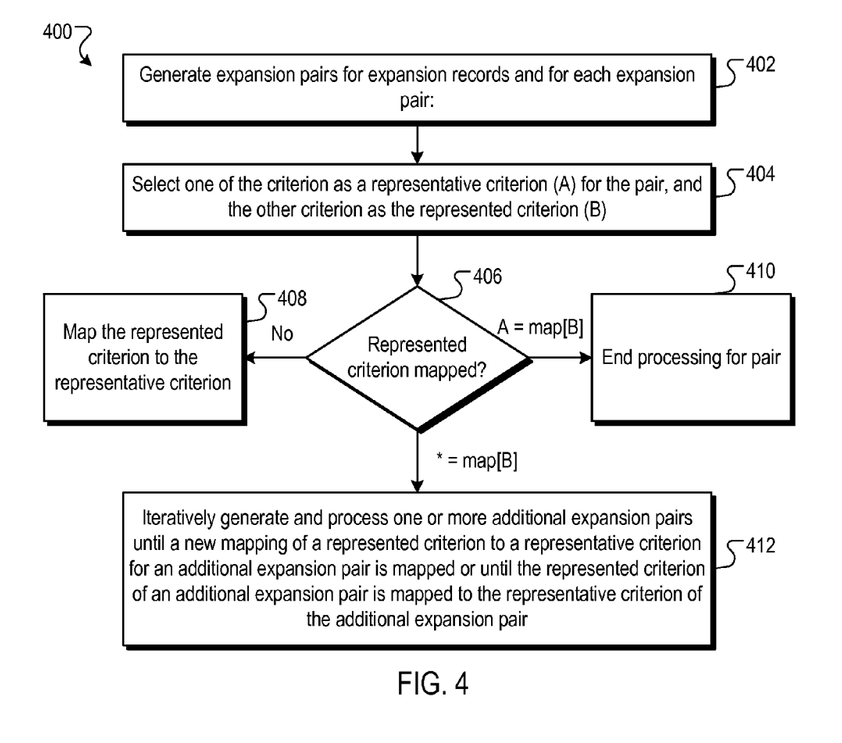
FIG. 4 is a flow diagram of an example process for generating sets of selection criteria mappings.

FIG. 4 is a flow diagram of an example process 400 for generating sets of selection criteria mappings. The process 400 is based, in part, on the expansion assumptions above.

The process 400 accesses set of expansion records and for each record generates an expansion pair for each expansion criterion of the one or more expansion criterion. Each expansion pair is a criterion pair of the criterion and the expansion criterion. For example, for an expansion record of C1→{C1, C2, C3}, the following expansion pairs are generated: C1 ↔ C1, C1 ↔ C2 and C1 ↔ C3.

For each expansion pair, the process 400 selects one of the criterion as a representative criterion for the pair, and the other criterion as the represented criterion (404). The selection is based on a performance metric of each criterion of expansion pair. The criterion with the highest performance metric of the pair is the representative criterion (generally referred to as the "A" criterion), and the other is the represented criterion (generally referred to as the "B" criterion).

The process 400 determines whether the represented criterion is mapped to mapped criterion in a mapping table (406). If not, the process 400 maps the represented criterion to the representative criterion (408), e.g., map[B]=A.

If, however, the represented criterion is mapped to mapped criterion, there are two possible mappings; either the represented criterion is already mapped to the representative criterion (A=map [B]), or the represented criterion is mapped to some other criterion (*=map[B]). In the case of the former, A=map[B], processing of the pair is complete (410). In the case of the latter, *=map[B], the process 400 iteratively generates and processes one or more additional expansion pairs until a new mapping of a represented criterion to a representative criterion for an additional expansion pair is mapped or until the represented criterion of an additional expansion pair is mapped to the representative criterion of the additional expansion pair (412).

After the mapping is completed, the system identifies a first criterion mapped by one or more intermediate criteria to a final criterion, and updates the mapping table to map the first criterion directly to the final criterion. This results in a set of mapped criteria that are represented by a representative criterion.

Figure 5:
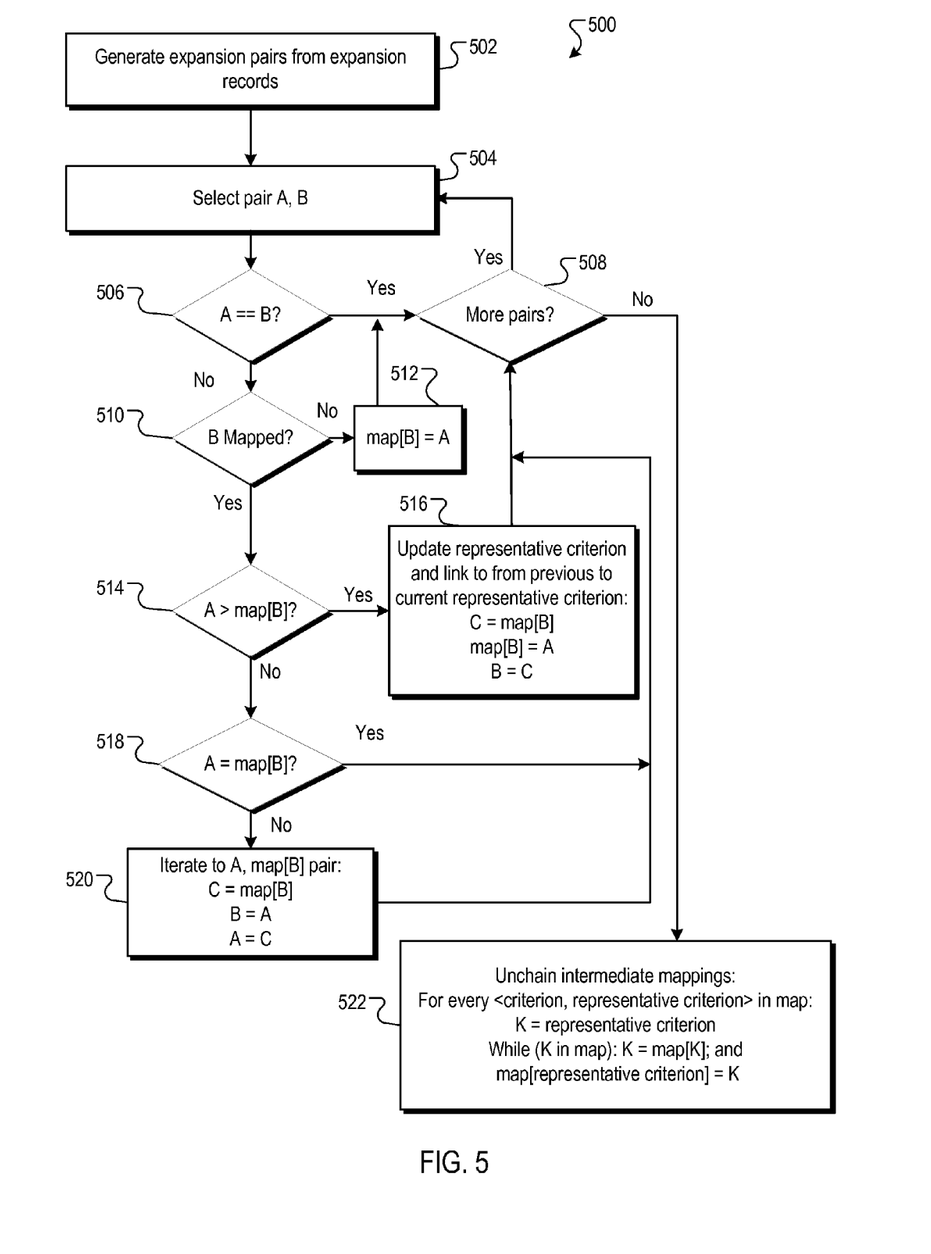
FIG. 5 is a flow diagram of another example process for generating sets of selection criteria mappings.

FIG. 5 is a flow diagram of another example process 500 for generating sets of selection criteria mappings. The process 500 may be used, for example, as one implementation example of the process 400. For purposes of illustration, the process 500 is described with reference to three expansion records:

R1: C1→{C1, C2, C3}
R2: C2→>{C3, C4}
R3: C4→{C0}

Furthermore, assume the performance measures of the criteria are such that the criteria are ranked in order of their respective numerical designators, with C0 having the highest performance measure:

C0→C1→C2→C3→C4

The process 500 generates expansion pairs from expansion records (502). For example, for record R1, the expansion pairs are, in terms of representative criterion A and represented criteria B (A↔B):

C1 ↔ C1
C1 ↔ C2
C1 ↔ C3
For record R2:
C2 ↔ C3
C2 ↔ C4
For record R3:
C0 ↔ C4

Assume a mapping table is empty. The process selects an expansion pair A, B (504), and determines if A equals B (506). For example, for expansion pair C1 ↔ C1, C1=C1. The process 500 does not map a value to itself, and thus determines if more expansion pairs are available (508).

The next expansion pair that is selected is C1 ↔ C2 (504). Because C1 is not equal to C2, the process 500 determines if the represented criterion B is mapped in the mapping table (510). Because the mapping table is empty, B is not mapped, and thus the process 500 maps the represented criterion to the representative criterion, map[B]=A (512). The same result will occur for the expansion pair C1 ↔ C3. Thus, after the expansion pairs for the record R1 are processed, the mapping table is as followings:

| |
|---|
| map[C2] = C1 |
| map[C3] = C1 |

The process 500 then returns to 504 to select the next expansion pair C2 ↔ C3. The process determines the represented criterion is not the representative criterion (506) (i.e., A is not equal to B) and that C3 is mapped (510). Thus, the process proceeds to determine if the performance of C2 is greater than the performance of map[C3], i.e., A>map[B] at 514. According to the mapping table, map[C3] is C1. Thus, stage 514 is false as C2<C1 in terms of performance.

The process 500 determines if represented criterion C3 is mapped to representative criterion C2 (518) (i.e., A=map[B]). Here, C3 is not mapped to C2. Accordingly, the process 500 performs an iteration to generating and process and additional expansion pair (520). The additional expansion pair is the next expansion pair that is selected by steps 508 and 510. The iterations continue until a new mapping of a represented criterion to a representative criterion for an additional expansion pair is mapped (e.g., 510) or until the represented criterion of an additional expansion pair is mapped to the representative criterion of the additional expansion pair (518).

The process generates the mapping pair by shifting the representative criterion to the represented criterion (B=A, or, in this case, changing the represented criterion to C2), and then setting the representative criterion to the mapped value of the original represented criterion of the pair (swap value C=map[B] and A=C, or, in this case, C=map[C3], or C=C1, and thus A=C1). This results in the expansion pair C1 ↔ C2.

The process 500 then processes the expansion pair C1 ↔ C2 (508 and 510). For the expansion pair C1 ↔ C2, the process 500 will determine stage 506 is false (C1 is not equal to C2), stage 510 is true (C2 is mapped, i.e., map[C2]=C1), stage 514 is false (the performance of C1 is not greater than the performance of the criterion to which C2 is mapped, i.e., C1), and will proceed to stage 518. The process 500 will now determine, however, that the represented criterion is mapped to the representative criterion (518) (i.e., A=map[B], or C1=map[C2]). Thus, no change is made to the mapping table and the next expansion pair is processed. Therefore, after processing the pair C2 ↔ C3, the mapping table is as follows:

| |
|---|
| map[C2] = C1 |
| map[C3] = C1 |

The process 500 then selects the expansion pair C2 ↔ C4. The process 500 will determine stage 506 is false (C2 is not equal to C4) and stage 510 is false (C4 is not mapped). Accordingly, the criterion C4 is mapped to C2 (512). Therefore, after processing the pair C2 ↔ C4, the mapping table is as follows:

```
map[C2] = C1
map[C3] = C1
map[C4] = C2
```

The process 500 then selects the expansion pair C0↔C4. The process 500 will determine stage 506 is false (C0 is not equal to C4), stage 510 is true (C4 is mapped, i.e., map[C4]=C2), and that stage 514 is true (the performance of C0 is greater than the performance of the criterion to which C4 is mapped, i.e., C2). In response, the process 500 generates an additional expansion pair of the representative criterion and the mapped criterion to which the represented criterion is mapped, and updates the mapping of the mapped criterion to the representative criterion (516). In particular, the process 500 sets a swap value C to the value to which B is mapped, e.g., C=map[C4], or C=C2. The process the maps the represented criterion to the representative criterion, e.g., map[C4]=C0, and then generates a new pair of the representative criterion and the swap value, e.g., C0↔C2. The additional expansion pair is the next expansion pair that is selected by steps 508 and 510. Thus, after processing C0↔C4, the mapping table is as follows:

```
map[C2] = C1
map[C3] = C1
map[C4] = C0
```

The process 500 then processes the newly generated expansion pair C0↔C2. The process 500 will determine stage 506 is false (C0 is not equal to C2), stage 510 is true (C2 is mapped, i.e., map[C2]=C1), and that stage 514 is true (the performance of C0 is greater than the performance of the criterion to which C2 is mapped, i.e., C1). In response, the process 500 again generates an additional expansion pair of the representative criterion and the mapped criterion to which the represented criterion is mapped, and updates the mapping of the mapped criterion to the representative criterion (516). In particular, the process 500 sets a swap value C to the value to which B is mapped, e.g., C=map[C2], or C=C1. The process the maps the represented criterion to the representative criterion, e.g., map[C2]=C0, and then generates a new pair of the representative criterion and the swap value, e.g., C0↔C1. The additional expansion pair is the next expansion pair that is selected by steps 508 and 510. Thus, after processing C0↔C2, the mapping table is as follows:

```
map[C2] = C0
map[C3] = C1
map[C4] = C0
```

The process 500 then processes the newly generated expansion pair C0↔C1. The process 500 will determine stage 506 is false (C0 is not equal to C1) and stage 510 is false (C1 is not mapped). Accordingly, the criterion C1 is mapped to C0 (512). Therefore, after processing the pair C0↔C1, the mapping table, sorted in order of the performance of the mapped criteria, is as follows:

```
map[C1] = C0
map[C2] = C0
map[C3] = C1
map[C4] = C0
```

The process 500 then determines no additional pairs are to be processed (508). The process 500 proceeds to unchain intermediate mappings (522). In the mapping table, the criterion C3 is mapped to C1. The criterion C1, however, is mapped to C0 and is an intermediate mapping. Thus, by the chaining assumption, C3 should be mapped to C0. In some implementations, to update the mapping table, the process 500, for every mapping in the mapping table, identifies a first criterion mapped by one or more intermediate criteria to a final criterion and updates the mapping table to map the first criterion directly to the final criterion. For example, the process 500 can select an index criterion as an iteration index criterion K. The index criterion in the mapping table is the representative criterion of the mapped pair, and thus K=representative criterion.

The process 500 iteratively selects selecting mappings based on the iteration index criterion, and each iteration results in one of a selection of an iteration index criterion for a next iteration or a null selection, e.g., while (K in map): K=map[K]. The null selection occurs when an iteration index K for an iteration is not mapped to a mapped criterion. For example, for the first mapping in the map table map[C1]=C0, K is set to C0. Because C0 is not mapped to a representative criterion (e.g., there is no map[C0] in the table), a null selection occurs. Thus, no update to the mapping table will occur. The same result will occur for the selection of C2.

However, for the selection of C3, K is initially set to C1. Because C1 is in the mapping table (map[C1]=C0), K will be updated to C0 by the operations K=map[K]. In particular, the operation of K=map[C1] sets the iteration index to C0. During the next iteration a null selection will occur. Accordingly, for the selection of the criterion C3, the mapping is updated so that C3 is mapped to the current iteration index (map[representative criterion]=K), or map[C3]=C0. Thus, after the processing of C3, the mapping table is as follows:

```
map[C1] = C0
map[C2] = C0
map[C3] = C0
map[C4] = C0
```

The final mapping of C4, which is mapped to C0, will not result in an update to the table. Thus, at the end of the process 500, the mapping table above is generated from the expansion records R1, R2 and R3.

The process 500 will thus generate disjoint mappings from expansion records, where each disjoint set are mappings to a particular representative criterion.

Additional Implementation Details

In situations in which the systems discussed here collect information about users, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, comprising:
   accessing a first set of selection criteria for a content item;
   selecting, based on the first set of selection criteria, a second set of selection criteria, the second set of selection criteria being a proper subset of the first set of selection criteria, the selection of each of the criteria in the second set comprising:
   determining a collective performance measure based on criteria that have been selected from the first set of selection criteria for inclusion in the second set of selection criteria;
   determining, for each criterion that has not been selected from the first set, a performance contribution to the collective performance measure; and
   selecting from the first set a selection criterion with the highest performance contribution relative to the performance contributions of other selection criteria that have not been selected for inclusion in the second set.

2. The method of claim 1, wherein the first set of selection criteria for the content item comprises:
   a first subset of selection criteria; and
   a second subset of selection criteria that is automatically generated from the first subset of selection criteria.

3. The method of claim 1, wherein:
   the first set of selection criteria comprises disjoint sets of mapped criteria; and
   selecting from the first set the selection criterion with the highest performance contribution relative to the performance contributions of other selection criteria that have not been selected for inclusion in the second set comprises selecting at least one mapped selection criterion from the disjoint set of mapped criteria to which the selection criterion belongs according to a ranking of the mapped selection criterion in the disjoint set of mapped criteria.

4. The method of claim 1, further comprising accessing the second set of selection criteria to select a content item in response to a content item request, the selection of the content item being based on the second set of selection criteria.

5. A method performed by one or more data processing apparatus, comprising:
   determining a plurality of disjoint sets of mapped criteria, each disjoint set of mapped criteria describing:
   one or more criteria mapped to a representative criterion; and
   a ranking of the one or more criterion and the representative criterion based on a respective performance metric for each criterion, wherein the representative criterion is ranked highest relative to the one or more criterion in the disjoint set;
   receiving a request for a content item, the request subject to a set of selection criteria, each of the selection criterion being expandable into one or more expansion criteria;
   selecting, based the selection criteria, one or more disjoint sets of the mapped criteria, each of the selected disjoint sets being a set to which at least one of the selection criteria belongs; and
   for each selection criterion in the set of selection criteria, selecting at least one criterion from the disjoint set of mapped criteria to which the selection criterion belongs according to the ranking of the one or more criterion and the representative criterion in the disjoint set of mapped criteria.

6. The method of claim 5, wherein selecting at least one criterion from the disjoint set of mapped criteria to which the selection criterion belongs comprises:
   determining whether a particular disjoint set is selected for two or more of the selection criterion or only one selection criterion;
   in response to determining that the particular disjoint set is selected for only one selection criterion, selecting the representative criterion of the particular disjoint set; and
   in response to determining that the particular disjoint set is selected for two more selection criterion, respectively selecting the representative criterion of the particular disjoint set and one or more mapped criterion according to the respective ranking of the mapped criteria of the disjoint set.

7. The method of claim 6, wherein determining a plurality of disjoint sets of mapped criteria comprises:
   for each of a set of expansion records, each expansion record specifying an expansion of a criterion to one or more expansion criteria:
   generating, by a data processing apparatus, an expansion pair for each expansion criterion of the one or more expansion criterion, each expansion pair being a criterion pair of the criterion and the expansion criterion;
   for each expansion pair:
   selecting one of the criterion as a representative criterion for the pair, and the other criterion as the represented criterion, the selection being based on a performance metric of each criterion of expansion pair;
   determining, by the data processing apparatus, whether the represented criterion is mapped to mapped criterion in the mapping table;
   in response to determining that the represented criterion is not mapped to mapped criterion in the mapping table, mapping, by the data processing apparatus, the represented criterion to the representative criterion; and in response to determining that the represented criterion is mapped to mapped criterion in the mapping table and that the represented criterion is not mapped to the representative criterion, iteratively generating and processing one or more additional expansion pairs until a new mapping of a represented criterion to a representative criterion for an additional expansion pair is mapped or until the represented criterion of an additional expansion pair is mapped to the representative criterion of the additional expansion pair.

8. The method of claim 7, wherein iteratively generating and processing one or more additional expansion pairs comprises:

determining whether a performance metric of the representative criterion is greater than the performance metric of a mapped criterion to which the represented criterion is mapped;

in response to determining that the performance metric of the representative criterion is greater than the performance metric of the mapped criterion to which the represented criterion is mapped:

generating an additional expansion pair of the representative criterion and the mapped criterion to which the represented criterion is mapped; and updating the mapping of the mapped criterion to the representative criterion; and in response to determining that the performance metric of the representative criterion is not greater than the performance metric of the mapped criterion to which the represented criterion is mapped:

generating an additional expansion pair of the represented criterion and the mapped criterion to which the represented criterion is mapped.

9. The method of claim 8, further comprising:

identifying a first criterion mapped by one or more intermediate criteria to a final criterion; and updating the mapping table to map the first criterion directly to the final criterion.

10. The method of claim 9, wherein:

identifying a first criterion mapped by one or more intermediate criteria to a final criterion comprises:

selecting an index criterion as an iteration index criterion;

iteratively selecting mappings based on the iteration index criterion, each iteration resulting in one of a selection of an iteration index criterion for a next iteration or a null selection, wherein:

the selection of an iteration index for the next iteration occurs when the iteration index criterion for a current iteration is mapped to mapped criterion, and in response the mapped criterion is selected as the iteration index for the next iteration; and the null selection occurs when an iteration index for an iteration is not mapped to a mapped criterion; and updating the mapping table to map the first criterion directly to the final criterion comprises, in response to the null selection, updating the mapping of the index criterion to the iteration index of the iteration that resulted in the null selection.

11. The method of claim 7, further comprising:

identifying a first criterion mapped by one or more intermediate criteria to a final criterion; and updating the mapping table to map the first criterion directly to the final criterion.

12. The method of claim 11, wherein:

identifying a first criterion mapped by one or more intermediate criteria to a final criterion comprises:

selecting an index criterion as an iteration index criterion;

iteratively selecting mappings based on the iteration index criterion, each iteration resulting in one of a selection of an iteration index criterion for a next iteration or a null selection, wherein:

the selection of an iteration index for the next iteration occurs when the iteration index criterion for a current iteration is mapped to mapped criterion, and in response the mapped criterion is selected as the iteration index for the next iteration; and the null selection occurs when an iteration index for an iteration is not mapped to a mapped criterion; and updating the mapping table to map the first criterion directly to the final criterion comprises, in response to the null selection, updating the mapping of the index criterion to the iteration index of the iteration that resulted in the null selection.

13. The method of claim 5, wherein each criterion is a keyword.

14. A method performed by a data processing apparatus, comprising:

for each of a set of expansion records, each expansion record specifying an expansion of a criterion to one or more expansion criteria:

generating, by a data processing apparatus, an expansion pair for each expansion criterion of the one or more expansion criterion, each expansion pair being a criterion pair of the criterion and the expansion criterion;

for each expansion pair:

selecting one of the criterion as a representative criterion for the pair, and the other criterion as the represented criterion, the selection being based on a performance metric of each criterion of expansion pair;

determining, by the data processing apparatus, whether the represented criterion is mapped to mapped criterion in the mapping table;

in response to determining that the represented criterion is not mapped to mapped criterion in the mapping table, mapping, by the data processing apparatus, the represented criterion to the representative criterion; and in response to determining that the represented criterion is mapped to mapped criterion in the mapping table and that the represented criterion is not mapped to the representative criterion, iteratively generating and processing one or more additional expansion pairs until a new mapping of a represented criterion to a representative criterion for an additional expansion pair is mapped or until the represented criterion of an additional expansion pair is mapped to the representative criterion of the additional expansion pair.

15. The method of claim 14, wherein iteratively generating and processing one or more additional expansion pairs comprises:

determining whether a performance metric of the representative criterion is greater than the performance metric of a mapped criterion to which the represented criterion is mapped;

19 in response to determining that the performance metric of the representative criterion is greater than the performance metric of the mapped criterion to which the represented criterion is mapped:
  generating an additional expansion pair of the representative criterion and the mapped criterion to which the represented criterion is mapped; and
  updating the mapping of the mapped criterion to the representative criterion; and
in response to determining that the performance metric of the representative criterion is not greater than the performance metric of the mapped criterion to which the represented criterion is mapped:
  generating an additional expansion pair of the represented criterion and the mapped criterion to which the represented criterion is mapped.

16. The method of claim 15, further comprising:
identifying a first criterion mapped by one or more intermediate criteria to a final criterion; and
updating the mapping table to map the first criterion directly to the final criterion.

17. The method of claim 16, wherein:
identifying a first criterion mapped by one or more intermediate criteria to a final criterion comprises:
  selecting an index criterion as an iteration index criterion;
  iteratively selecting mappings based on the iteration index criterion, each iteration resulting in one of a selection of an iteration index criterion for a next iteration or a null selection, wherein:
    the selection of an iteration index for the next iteration occurs when the iteration index criterion for a current iteration is mapped to mapped criterion, and in response the mapped criterion is selected as the iteration index for the next iteration; and
    the null selection occurs when an iteration index for an iteration is not mapped to a mapped criterion; and
  updating the mapping table to map the first criterion directly to the final criterion comprises, in response to the null selection, updating the mapping of the index criterion to the iteration index of the iteration that resulted in the null selection.

18. The method of claim 14, further comprising:
identifying a first criterion mapped by one or more intermediate criteria to a final criterion; and
updating the mapping table to map the first criterion directly to the final criterion.

19. The method of claim 18, wherein:
identifying a first criterion mapped by one or more intermediate criteria to a final criterion comprises:
  selecting an index criterion as an iteration index criterion;
  iteratively selecting mappings based on the iteration index criterion, each iteration resulting in one of a selection of an iteration index criterion for a next iteration or a null selection, wherein:
    the selection of an iteration index for the next iteration occurs when the iteration index criterion for a current iteration is mapped to mapped criterion, and in response the mapped criterion is selected as the iteration index for the next iteration; and
    the null selection occurs when an iteration index for an iteration is not mapped to a mapped criterion; and
  updating the mapping table to map the first criterion directly to the final criterion comprises, in response to

20 the null selection, updating the mapping of the index criterion to the iteration index of the iteration that resulted in the null selection.

20. The method of claim 14, further comprising:
receiving a request for a content item, the request subject to a set of selection criteria, each of the selection criterion being expandable into one or more expansion criteria;
selecting based the selection criteria disjoint sets of mapped criteria, each set of mapped criteria being criteria mapped to a particular criterion, and each of the disjoint sets being a set to which at least one of the selection criteria belongs; and
for each selection criterion in the set of selection criteria, selecting a criterion value from the disjoint set of mapped criteria to which the selection criterion belongs.

21. The method of claim 20, wherein selecting a criterion value from the disjoint set of mapped criteria to which the selection criterion belongs comprises selecting criterion values from the disjoint set in an order based on the performance metric for each criterion.

22. A non-transitory computer readable storage device storing instructions executable by a data processing apparatus, and wherein upon such execution the instructions cause the data processing apparatus to perform operations comprising:
  accessing a first set of selection criteria for a content item;
  selecting, based on the first set of selection criteria, a second set of selection criteria, the second set of selection criteria being a proper subset of the first set of selection criteria, the selection of each of the criteria in the second set comprising:
    determining a collective performance measure based on criteria that have been selected from the first set of selection criteria for inclusion in the second set of selection criteria;
    determining, for each criterion that has not been selected from the first set, a performance contribution to the collective performance measure; and
    selecting from the first set a selection criterion with the highest performance contribution relative to the performance contributions of other selection criteria that have not been selected for inclusion in the second set.

23. A non-transitory computer readable storage device storing instructions executable by a data processing apparatus, and wherein upon such execution the instructions cause the data processing apparatus to perform operations comprising:
  determining a plurality of disjoint sets of mapped criteria, each disjoint set of mapped criteria describing:
    one or more criteria mapped to a representative criterion; and
    a ranking of the one or more criterion and the representative criterion based on a respective performance metric for each criterion, wherein the representative criterion is ranked highest relative to the one or more criterion in the disjoint set;
  receiving a request for a content item, the request subject to a set of selection criteria, each of the selection criterion being expandable into one or more expansion criteria;
  selecting, based the selection criteria, one or more disjoint sets of the mapped criteria, each of the selected disjoint sets being a set to which at least one of the selection criteria belongs; and
  for each selection criterion in the set of selection criteria, selecting at least one criterion from the disjoint set of mapped criteria to which the selection criterion belongs according to the ranking of the one or more criterion and the representative criterion in the disjoint set of mapped criteria.

24. A system, comprising:

one or more data processing apparatus; and a computer readable storage device in data communication with the one or more data processing apparatus and storing instructions executable by a data processing apparatus, and wherein upon such execution the instructions cause the data processing apparatus to perform operations comprising:

accessing a first set of selection criteria for a content item;

selecting, based on the first set of selection criteria, a second set of selection criteria, the second set of selection criteria being a proper subset of the first set of selection criteria, the selection of each of the criteria in the second set comprising:

determining a collective performance measure based on criteria that have been selected from the first set of selection criteria for inclusion in the second set of selection criteria;

determining, for each criterion that has not been selected from the first set, a performance contribution to the collective performance measure; and     selecting from the first set a selection criterion with the highest performance contribution relative to the performance contributions of other selection criteria that have not been selected for inclusion in the second set.

25. A system, comprising:

one or more data processing apparatus; and a computer readable storage device in data communication with the one or more data processing apparatus and storing instructions executable by a data processing apparatus, and wherein upon such execution the instructions cause the data processing apparatus to perform operations comprising:

determining a plurality of disjoint sets of mapped criteria, each disjoint set of mapped criteria describing:

one or more criteria mapped to a representative criterion; and     a ranking of the one or more criterion and the representative criterion based on a respective performance metric for each criterion, wherein the representative criterion is ranked highest relative to the one or more criterion in the disjoint set;

receiving a request for a content item, the request subject to a set of selection criteria, each of the selection criterion being expandable into one or more expansion criteria;

selecting, based the selection criteria, one or more disjoint sets of the mapped criteria, each of the selected disjoint sets being a set to which at least one of the selection criteria belongs; and for each selection criterion in the set of selection criteria, selecting at least one criterion from the disjoint set of mapped criteria to which the selection criterion belongs according to the ranking of the one or more criterion and the representative criterion in the disjoint set of mapped criteria.

* * * * *